United States Patent
Snels

(10) Patent No.: US 6,871,932 B2
(45) Date of Patent: Mar. 29, 2005

(54) QUALITY ASSESSMENT OF HARD COPY RECORDERS

(75) Inventor: Jozef Snels, Westmalle (BE)

(73) Assignee: AGFA-Gevaert, Mortsel (BE)

( * ) Notice: Subject to any disclaimer, the term of this patent is extended or adjusted under 35 U.S.C. 154(b) by 84 days.

(21) Appl. No.: 10/614,406

(22) Filed: Jul. 7, 2003

(65) Prior Publication Data

US 2004/0032984 A1 Feb. 19, 2004

Related U.S. Application Data

(60) Provisional application No. 60/403,301, filed on Aug. 14, 2002.

(30) Foreign Application Priority Data

Sep. 7, 2002 (EP) .............................. 02100793

(51) Int. Cl.⁷ ............................................. B41J 29/393
(52) U.S. Cl. ................. 347/19; 347/3; 358/1.9
(58) Field of Search ............................... 347/19, 15, 43, 347/16, 3, 14; 358/501, 504, 1.2, 1.9

(56) References Cited

U.S. PATENT DOCUMENTS 6,356,292 B1 * 3/2002 Sawano ....................... 347/251

FOREIGN PATENT DOCUMENTS

| | | | |
|---|---|---|---|
| EP | 0 269 033 A2 | * | 6/1988 |
| EP | 0 599 261 A1 | * | 6/1994 |
| EP | 02 10 0793 | * | 11/2002 |
| WO | WO 95/31065 | * | 11/1995 |

* cited by examiner

*Primary Examiner*—Lamson Nguyen
(74) *Attorney, Agent, or Firm*—John A. Merecki; Hoffman, Warnick & D'Alessandro LLC

(57) ABSTRACT

Quality of a hard copy recorder is assessed by generating a hard copy of a test image stored in digital form. Test values can be measured on the generated test image inside the recorder and an image quality report can be generated on the tested recorder.

7 Claims, No Drawings

QUALITY ASSESSMENT OF HARD COPY RECORDERS

This application claims benefit of 60/403,301, Aug. 14, 2002.

FIELD OF THE INVENTION

The present invention relates to quality assessment of hard copy recording systems, such as thermal recorders used in healthcare applications for example for generating a hard copy of a mammographic image.

BACKGROUND OF THE INVENTION

Nowadays several image acquisition systems exist that render medical images such as mammographic images in the form of digital signal representations.

An example of such an image acquisition system is a system based on temporary storage of the medical image such as a mammographic image on a photo-stimulable phosphor screen.

A digital signal representation of the medical image is obtained by scanning a screen which has been exposed to a radiation image by means of stimulating radiation, detecting light emitted by the screen upon stimulation and converting the detected light into an electric signal representation.

Another example of such an image acquisition system is a so-called direct radiography system wherein a radiation image is recorded by a two-dimensional array of radiation sensitive elements that, upon addressing, render a digital signal representation of the radiation image.

Still other examples may be envisaged.

For the purpose of diagnosis commonly a visible reproduction, either in the form of a hard copy or a soft copy is generated from the digital medical image.

To that end the digital signal representation of the medical image is applied to a hard copy recorder such as a thermal printer.

In case the diagnosis is performed on the hard copy image, the hard copy is attached to a viewing box for visual inspection and examination by the radiologist.

In order to obtain constant image quality of the hard copy recorded by a hard copy recorder, a regular evaluation of the image quality of the device is to be performed.

The relevant regulation such as the 'Mammography Quality Standard Act (MQSA)' of the Food and Drug Administration (FDA) prescribes the contents and the frequency of the measurements to be performed. For mammographic image recording a number of reference values need to be tested before initial use of the recorder and, once these test are satisfactory, quality tests must be performed regularly. Some measurements are to be made on a daily basis, others on a weekly and on a semi-annual basis.

The results of the tests must be saved in order to comply inter alia with the above-mentioned MQSA.

The prior art test method generally consists of three major steps: printing a test pattern, measuring certain values on the printed test pattern, evaluating the measured values relative to reference values.

Commonly after installation of the recorder and before initial use, a test procedure is performed to generate base line values for further follow up. These values must also be determined again after total overhaul and major repair.

The daily measurements comprise: measurement of fog density, mid density, maximum density and density difference between two predefined values.

The weekly evaluations comprise a visual test under controlled conditions following a prescribed procedure. According to this test the visibility of a number of white dots situated in a black background is tested.

The monthly test comprises geometric measurements, i.e. length of edges of a printed rectangular need to be measured.

It is also possible to calculate certain values from measured values.

Next, according to the prior art method, the measured and/or calculated values are copied onto so-called quality control charts. In addition to the measured values the following data regarding the test conditions are also to be filled out:

type and serial number of the mammographic system, type and serial number of the recorder, target maximum density during calibration, type and emulsion number of the recording material, type and serial number of external densitometer.

Finally the measured values are compared with preset limits. If the measured values do not reach a preset minimum limit or exceed a preset maximum limit, suitable measures are taken. The action must be documented.

The above-described daily test procedure takes a lot of time, it is estimated that about 30 minutes per day are spent in performing the daily test procedure.

Furthermore, the test procedure requires the intervention of a trained operator who is acquainted with the procedure to be performed.

The operator needs to be present at the location of the recorder.

He needs to perform a number of manual operations.

Such a method is time-consuming and error prone.

It is an aspect of the present invention to provide a quality assessment method and system that overcomes the prior art disadvantages.

SUMMARY OF THE INVENTION

The present invention provides a method as set out in claim 1. Another aspect of the invention relates to an apparatus as set out in the claims.

Specific features for preferred embodiments of the invention are set out in the dependent claims.

The quality of the reproduction characteristics of the recorder is assessed by generating a hard copy test image by means of the recorder and by measuring test values on the hard copy test image. The measured test values can then be compared with predefined limits and a corrective measure is performed if a measured test value exceeds a predefined maximum limit or is smaller than a predefined minimum limit.

According to the present invention the hard copy is generated by initiating a test print procedure on the recorder, this procedure can be initiated via a remote PC or via the recorder itself. The test print procedure comprises the steps of (1) retrieving from a memory a digital signal representation of a test image, (2) controlling the recorder to generate a hard copy corresponding with said digital signal representation of said test image.

The test print procedure can be initiated on the recorder itself or can be initiated from a remote personal computer.

In the context of the present invention a test image is an image that comprises items that need to be measured for evaluating the reproduction quality of a hard copy recorder.

In practice such a test image needs to enable measurement of the characteristics prescribed by the relevant regulation such as MQSA in case of mammography.

Commonly such a test image comprises area onto which a specific, predefined density values are to be printed such as fog density, maximum density etc.

According to the present invention, the recorder is controlled by means of digital values corresponding with the predefined density values in order to reproduce predefined density values on predefined locations.

By measuring the reproduced density and by comparing this value with predefined limits surrounding the envisaged density value, the reproduction quality of the recorder is assessed.

Apart from density values the test image may also comprise other items such as geometric figures which permit to evaluate the geometric reproduction quality of the recorder. For example a rectangular may be provided on the test image.

Still other items are possible such as collections of very fine dots, the reproduction of which can be tested.

The reproduced density values are measured for example by means of a densitometer which is external to the recorder.

In a specific embodiment of the present invention a densitometer is situated inside the recorder and is arranged to measure density values on the hard copy image of the test image.

This embodiment is advantageous for the following reasons.

No operator intervention is required for performing the measurement so that it becomes possible to economize on manpower.

Furthermore the same densitometer is used for every test procedure on a specific recorder and the same type of densitometer can be used on all recorders of the same type so that measurements are made more uniform and so that comparisons can be more easily performed.

The operation will can be performed faster and is less error prone.

The method of the present invention is furthermore advantageous since the fact that the test image is stored in digital form and the measurements are performed 'on-line' in the recorder, has as a consequence that no knowledge on the test procedure or of the types of measurements to be performed is required. Operator intervention is avoided.

It is also possible that a number of characteristic values are calculated within the recorder by means of a processing unit that is programmed to perform these calculations. It is also possible that these characteristic values are calculated on a remote PC connected with the recorder. Like-wise this embodiment provides less human intervention and is less error prone.

The test results can be shown on a display unit part of the recorder so that they can be copied by the operator onto a test sheet. However, less errors will occur when the recorder is programmed to generate a digital file comprising all measured and calculated values. Preferably this file also comprises identification data identifying the recorder, the recording material, the data and time of the measurement, etc.

The measured values can be compared in this processing unit part of the recorder with limits that stored in advance in a memory device part of the recorder so that the digital file comprises the measurement values situated relative to the relevant limits. Alternatively these limits can be stored on a remote PC connected to the recorder and the comparison can be performed on the remote PC.

This recorder or the remote PC can further be programmed to generate a hard copy quality report reproducing the data of this file.

If the data are stored in a file, this file can be accessed via network by a remote PC. In this way the operator does not need to be present on the location where the recorder is situated.

The test procedure can be initiated from a remote location and the report can also be retrieved and occasionally printed on a remote location.

The actions that need to be performed when measured values exceed the given limits are prescribed by regulations such as MQSA. Such regulations may also prescribe that the performed actions need to be documented.

In certain occasions MQSA or other regulations prescribe that the recorder needs to be stopped.

In one embodiment of the present invention the recorder is arranged so that a warning is given, e.g. a visible or auditive warning, once a measured value falls outside a given limit. In alternative embodiment such a warning is given by a remote pC connected to the recorder.

When certain measured values fall outside the limits stored in advance in a memory device, the recorder can be stopped by the operator.

In another embodiment the recorder is controlled so that, when certain measured values fall outside the limits stored in advance in a memory device, the operation of the recorder is automatically stopped without operator intervention. Alternatively this stop can be generated under control of a remote PC connected to the recorder.

In general the hard copy recorder according to the present invention thus comprises a memory wherein a digital signal representation of a test image is stored, means for controlling a print head of said recorder to generate a hard copy corresponding with said digital signal representation of said test image on a recording material.

A particular embodiment comprises a densitometer arranged inside the recorder for measuring density values on the hard copy corresponding with said digital signal representation of said test image.

Means for measuring other items, such as geometric quantities may be provided.

A particular embodiment also comprises a memory wherein limits have been stored for measured values and processing means for comparing measured values with retrieved limits.

Still another embodiment comprises means for generating a hard copy quality report and/or a digital file comprising at least said measured density values.

Although the present invention has been made in the context of a thermal hard copy recorder, it will be clear that the invention can also be used in connection with other types of recorders.

The invention is particularly relevant for medical mammographic image recording because of the high quality requirements in this field. It is however likewise applicable to other fields of application.

What is claimed is:

1. Method of assessing the quality of the recording characteristics of a hard copy recorder comprising the steps of retrieving from a memory a digital signal representation of a test image, controlling the recorder to generate a hard copy of said test image corresponding with said digital signal representation, performing at least one density measurement on the hard copy of said test image by means of a densitometer part of said recorder, generating a digital quality report of said hard copy recorder, said quality report comprising at least the results of said density measurement, storing said quality report.

2. Method according to claim 1 wherein said digital quality report comprises data identifying the date of the measurement.

3. Method according to claim 1 wherein a hard copy of said quality report is generated by means of said hard copy recorder.

4. A hard copy recorder comprising a memory wherein a digital signal representation of a test image is stored, means for controlling said recorder to generate a hard copy corresponding with the digital signal representation of said test image on a recording material, a densitometer part of said recorder arranged for performing at least one density measurement on said test image, means for generating a digital quality report of said hard copy recorder, said quality report at least comprising the results of said density measurement, means for storing said digital quality report.

5. A hard copy recorder according to claim 4 arranged for generating a hard copy of said quality report.

6. A thermal hard copy recorder according to claim 5.

7. A thermal hard copy recorder according to claim 4.

* * * * *